United States Patent Office 3,784,579
Patented Jan. 8, 1974

---

3,784,579
DRILLING FLUID AGENT AND METHOD OF MAKING SAME
Raymond E. McGlothlin, Eugene R. Werlein, and Bruce E. Taylor, Houston, and Roger Lee Schultz, Tom Ball, Tex., assignors to Dresser Industries, Inc., Dallas, Tex.
No Drawing. Continuation-in-part of abandoned application Ser. No. 816,040, Apr. 14, 1969. This application Mar. 13, 1972, Ser. No. 234,381
Int. Cl. E21b *21/04*
U.S. Cl. 260—414
12 Claims

ABSTRACT OF THE DISCLOSURE

A fluid-loss reduction agent for drilling fluids and a method for making same by reacting fatty acids, titanium compounds, and soap producing metals or metal oxide compounds.

CROSS REFERENCES TO RELATED APPLICATIONS

This is a continuation-in-part of application Ser. No. 816,040 filed Apr. 14, 1969 now abandoned and assigned to the assignees of the present invention.

BACKGROUND OF THE INVENTION

Filtration rate reduction, i.e., reduction in fluid loss, exhibited by drilling fluids has been a problem of long standing in the drilling industry and is recognized to be a particularly acute problem when high pressures, i.e., greater than 12,000 p.s.i.g., and high temperatures, i.e., greater than 250° F., are encountered in operation.

The problems of fluid loss with the use of drilling fluids is well known in the art. For example, see W. F. Rogers' book "Composition and Properties of Oil Well Drilling Fluids," 3rd edition, Gulf Publishing Company, Houston, Tex., 1963. For example, as indicated in this book on page 562, organic base drilling fluids with high viscosity oil bases still give large fluid losses, e.g., several hundred cubic centimeters during only 30 minutes of test time.

According to this invention, it has been unexpectedly discovered that by reacting fatty acids and certain titanium compounds to form a first reaction mixture and then by reacting this first mixture with certain metals or metal yielding compounds, a very superior fluid-loss reduction agent is formed.

Thus, this invention relates to a method for preparing the fluid-loss reduction agent of this invention and the agent itself.

This invention also relates to drilling fluids containing the agent of this invention.

The agent of this invention is useful in drilling fluids in general. Drilling fluids include drilling muds used for drilling in, completing, or working over wells, for packer fluids and the like. The drilling fluids of this invention are useful in wells which are subject to reduce productivity and/or shale sloughing and for drilling deep and/or hot wells which normally encounter technical difficulties and high cost for keeping muds in good condition with minimum fluid-loss rates.

Accordingly, it is an object of this invention to provide a new and improved fluid-loss reduction agent for drilling fluids. It is another object to provide a new and improved method for making improved fluid-loss reduction agents. It is another object to provide new and improved drilling fluids. It is a particular object of this invention to provide a drilling fluid additive, and a method for producing same, which has superior effect in reducing fluid loss characteristics of a drilling fluid when that drilling fluid is exposed to high pressures and high temperatures in operation in the well.

Other aspects, objects and advantages of this invention will be apparent to those skilled in the art from the disclosure and the appended claims.

DETAILED DESCRIPTION OF THE INVENTION

The method of this invention comprises reacting at least one fatty acid having from 10 to 31, preferably from 12 to 22, still more preferably from 18 to 22, carbon atoms per molecule, inclusive, with an effective reaction accelerating amount, preferably from about 0.01 to about 15, still more preferably from about 0.5 to about 2 weight percent based on the total weight of the fatty acid present, of at least one titanium reactant of the group:

$Ti(OR)_4$ where R is one of alkyl (linear or branched), cycloalkyl (including branched), and aryl (including branched), preferred alkyl (linear or branched), having from 1 to 22, preferably 1 to 18, carbon atoms per molecule, inclusive, the R's being the same or different in any given molecule;

$Ti(OCOR_1)_{4-n}(OR_1)_n$ where $n$ is 0 to 3, inclusive, $R_1$ is one of alkyl (linear or branched), cycloalkyl (including branched), and aryl (including branched), preferably alkyl (linear or branched), having from 1 to 22, preferably from 1 to 18, carbon atoms per molecule, inclusive, the $R_1$'s being the same or different in any given molecule; and a chelate of the formula

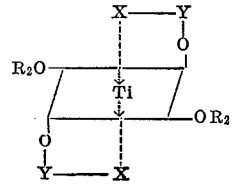

where X is one of oxygen and nitrogen; —OH, —NH, —N(R″OH)$_z$, preferably —OH, $$-N(CH_2-CH_2-OH)_2$$

and oxygen, R″ is alkyl having from 1 to 10 carbon atoms, inclusive, and $z$ is 1 or 2; Y is one of

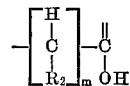

($R_2$ is hydrogen or alkyl, linear or branched, having from 1 to 8 carbon atoms, inclusive, and $m$ is 1 or 2),

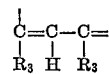

($R_3$ is alkyl, linear or branched, having from 1 to 8 carbon atoms, inclusive),

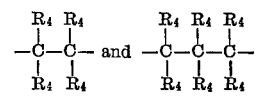

($R_4$ being one of hydrogen and alkyl, linear or branched, having from 1 to 4 carbon atoms, inclusive); and $R_2$ is one of hydrogen, alkyl (linear or branched) having from 1 to 10 carbon atoms, inclusive, and $R_5OH$ where $R_5$ is alkyl (linear or branched) having from 1 to 10 carbon atoms, inclusive.

It is presently preferred in the foregoing chelate structure that when X is oxygen, Y is

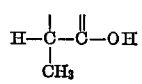

$R_2$ is hydrogen; when X is oxygen, Y is

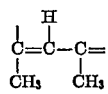

and $R_2$ is $C_3H_7$; when X is $-N(CH_2-CH_2-OH)_2$, Y is $-CH_2-CH_2-$, and $R_2$ is $C_3H_7$; and when X is $-OH$, Y is

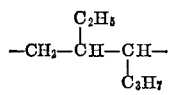

and $R_2$ is

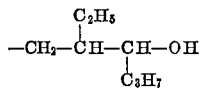

Suitable titanium reactants include tetraisopropyl titanate, tetrabutyl (including n-butyl, isobutyl, sec-butyl, tert-butyl), titanate, tetrakis (2-ethylhexyl)titanate, tetrastearyl titanate, polyhydroxy stearate, tetraoctylene glycol titanate, triethanolamine titanate, titanium acetyl acetonate, titanium lactate, alkali metal salts of titanium lactate, and ammonium salts of titanium lactate.

The reaction of one or more fatty acids with one or more titanium reactants can be carried out over broad ranges of temperature, pressure and time. Generally, for speed of reaction, an elevated temperature is employed but the elevated temperature should be below the decomposition temperature of either the fatty acid reactant or the titanium reactant. The reaction temperature can be from about 75 to about 450° F., preferably from about 200 to 350° F., for at least about 0.5 minute, preferably from about 3 minutes to about 2 hours. The reaction pressures can be ambient, sub-ambient or super ambient but are normally ambient. The reaction can be carried out, but need not necessarily be carried out, under anhydrous conditions.

The reaction can be carried out in the presence or absence of a reaction medium. When a reaction medium is employed, it will normally be a liquid chemical which is substantially inert to the fatty acid and titanium reactants, and the metal or metal yielding compound reactants to be discussed hereinafter. Suitable reaction mediums include organic solvents such as benzene, toluene, xylene, cyclohexane and the like. It is preferred that the fatty acid reactant used is substantially liquid at the reaction temperature.

The reaction of the fatty acid reactant and the titanium reactant produces a first reaction mixture. This reaction mixture is then reacted with at least one of a metal and metal oxide compound wherein the metal in both instances is one of alkaline earth metal (Be, Mg, Ca, Sr, Ba, Ra), Zn, Ni, Co, Mn and Cr. It is presently preferred to use the metals or oxide compounds Mg, Mn, Zn and Cr. Substantially any compound which will yield cations of the above mentioned metals under the conditions of the reaction and which is inert to the reactants and reaction product of the first reaction mixture can be employed, the primary requirement being the provision in the reaction of the cation for reaction with the first reaction mixture. Suitable metal oxide compounds include the oxides, acetates, hydroxides, sulfates and nitrates, preferably the oxides.

The metal and/or metal oxide compounds used can be comminuted to any desired degree of subdivision to speed the reaction. For example, the metal or metal oxide compound can be subdivided so that substantially all will pass a 100 mesh screen (Tyler Sieve Series).

The amount of metal and/or metal compound reactant employed can vary widely but will generally be at least about stoichiometric with respect to the amount of fatty acid used in forming the first reaction mixture. Up to a 15 weight percent excess of metal or metal oxide compound with respect to the fatty acid can be used. Greater than 15 weight percent excesses can also be used if an excess of unreacted metal or metal oxide compound is tolerable.

The second reaction can also be carried out under broad conditions of temperature, pressure and reaction time. For speed of reaction, the reaction temperature can generally be from about 100 to about 400° F. for at least about 0.5 minute, preferably from about 0.5 minute to about 2 hours. The pressure considerations are the same as for the first reaction mixture hereinabove. This reaction can also be, but need not necessarily be, carried out under anhdyrous conditions. This reaction can be carried out in the presence or absence, preferably absence, of one or more reaction mediums and the reaction mediums applicable are the same as those set forth hereinabove with respect to the formation of the first reaction mixture.

The reaction product of the second reaction comprises the fluid-loss reduction agent of this invention.

The fatty acid reactants useful in this invention vary broadly and can be saturated, unsaturated or mixtures thereof. Suitable fatty acids include at least one of capric, isocapric, lauric, tentadecanoic, palmitic, stearic, oleic, linoleic, behenic, tetracosanoic, cerotic and a fatty acid mixture normally obtained from vegetables or animals, e.g., tall oil, cotton seed, corn, coconut oil, soya, fish oil, animal fat and the like.

The titanium compounds suitable for use in this invention are large in number, known in the art, and available commercially. Therefore, the preparation need not be further discussed and, for the sake of brevity, will not be further discussed.

The fluid-loss reduction agent of this invention is composed of the reaction product of the fatty acid reactant and titanium reactant as described hereinabove and at least one metal as described hereinabove. The agent contains the titanium reactant in an effective reaction accelerating amount, preferably from about 0.01 to about 15, still more preferably from about 0.5 to about 2 weight percent based on the total weight of the fatty acid present and contains at least about a stoichiometric amount, preferably up to a 15 weight percent excess, of the metal or metals with respect to the fatty acid present.

The method and fluid loss reduction agent of this invention can be modified in manners known in the art and obvious to those skilled in the art without departing from the spirit of this invention. For example, in the preparation of the agent and, therefore, in the practice of the method of this invention, clays such as kaolin, bentonite, attapulgite and sepiolite can be added in addition to the metal or metal compound, the clay being added in amounts sufficient to take up water as formed by the reaction of the metal or metal compound with the first reaction mixture. This technique will provide a substantially dry product as opposed to the liquid product normally obtained.

In the following examples, all liquid filtration rates (fluid loss) are determined in accordance with the American Petroleum Institute's standard procedure for testing drilling fluids, Section 3, High Temperature-High Pressure Test.

Example I

Four samples were prepared, each sample contained 30 weight percent oleic acid, 15 weight percent stearic acid, 30 weight percent MgO and 25 weight percent attapulgite. Sample I contained no titanium compound, while samples 2, 3 and 4 contained 0.25 weight percent, 0.5 weight percent and 1 weight percent, respectively, tetraisopropyl titanate. All weight percents are based on the total weight of each sample.

Sample 1 was prepared by heating the fatty acids at 300° F. for 1½ hours and then pouring the heated fatty acids, at a temperature of 250° F., onto the mixed MgO and attapulgite. Samples 2–4 were prepared in the same manner except that when the fatty acids reached 300° F. the samples were contacted with the titanium reactant at 300° F. for 90 minutes before pouring of the fatty acids onto the MgO and attapulgite mixture.

Each sample was then mixed at ambient temperatures of about 75° F. with No. 2 Diesel oil and water in amounts sufficient to make each sample into an invert drilling fluid having a weight of 9 pounds per gallon or 378 lbs. per U.S. barrel.

The fifth sample was a blank which contained the above Diesel oil and water in amounts sufficient to form an invert emulsion of 9 lbs. per gallon plus a commercially available emulsifier—the Mg soap of oleic acid. This sample contained none of the additive in samples 1–4.

Each of the five samples were then tested for their high pressure-high temperature fluid loss, the results of which are shown in the following Table I:

TABLE I

| Sample number | High pressure-high temperature fluid loss with cubic centimeters of oil and water found in filtrate, 300° F./500 p.s.ig. |
|---|---|
| 1 (no titanate) | 50.4 with a trace of water. |
| 2 (0.25 weight percent titanate) | 4 with no water. |
| 3 (0.5 weight percent titanate) | 3.6 with no water. |
| 4 (1 weight percent titanate) | 4 with no water. |
| 5 (blank) | 60 with a trace of water. |

Samples 1–4 were also tested for their apparent viscosity, plastic viscosity, yield point in pounds per 100 square feet, and stability in cubic centimeters. In each case the values were substantially comparable so that samples 1–4 of this example were comparable in operating characteristics as a drilling fluid except that samples 2–4, the samples of this invention, enjoyed a greater than 10 fold decrease in fluid loss.

Example II

Five samples were prepared, each sample contained 30 weight percent oleic acid, 15 weight percent stearic acid, 30 weight percent metal oxide and 25 weight percent attapulgite. All samples contained 0.25 weight percent tetraisopropyl titanate. All weight percents are based on the total weight of each sample.

The samples were prepared by heating the fatty acids to 300° F. and then adding the titanium reactant maintaining at this temperature for 1½ hours before pouring the heated fatty acids at a temperature of 250° F. onto the metal oxide and attapulgite mixture.

Each sample was then mixed at ambient temperatures of about 75° F. with No. 2 Diesel oil and water in amounts sufficient to make each sample into an invert drilling fluid having a weight of 9 pounds per gallon or 378 pounds per U.S. barrel.

The sixth sample was a blank which contained the above diesel oil and water in amounts sufficient to form an invert emulsion of 9 pounds per gallon plus a commerically available emulsifier—the Mg soap of oleic acid.

Each of the six samples were then tested for their high pressure-high temperature fluid loss, the results listed in the following Table II:

TABLE II

| Sample: | High pressure-high temperature fluid loss with cubic centimeters of oil and water found in filtrate, 300° F./500 p.s.i. | |
|---|---|---|
| | Total cc.'s | Cc.'s water |
| Mn soap | 4.2 | (¹) |
| Ni soap | 7.2 | 0.5 |
| Co soap | 9.0 | (¹) |
| Zn soap | 5.8 | (¹) |
| Cr soap | 3.6 | (¹) |
| Blank | 62.8 | 7.6 |

¹ No water.

Reasonable variations and modifications are possible within the scope of this disclosure without departing from the spirit and scope of this invention.

The embodiments of the invention in which an exclusive property or privilege is claimed are defined as follows:

1. A method for making a fluid-loss reduction agent for drilling fluids comprising reacting at least one fatty acid having 10 to 31 carbon atoms per molecule, inclusive, with an effective reaction accelerating amount of at least one of Ti(OR)$_4$ where R is alkyl having from 1 to 22 carbon atoms per molecule, inclusive, Ti(OCOR$_1$)$_{4-n}$ (OR$_1$)$_n$ where $n$ is 0 to 3, inclusive, and R$_1$ is alkyl, having from 1 to 22 carbon atoms per molecule, inclusive, and

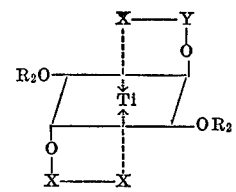

where X is one of oxygen, nitrogen; —OH, —NH, —N(R″OH)$_z$, R″ is alkyl having from 1 to 10 carbon atoms, inclusive, and $z$ is 1 or 2; Y is one of

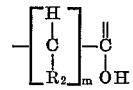

R$_2$ being hydrogen or alkyl having from 1 to 8 carbon atoms, inclusive, $m$ is 1 or 2,

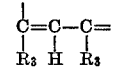

R$_3$ being alkyl having from 1 to 8 carbon atoms, inclusive,

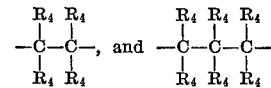

R$_4$ being one of hydrogen and alkyl having from 1 to 4 carbon atoms, inclusive; and R$_2$ is one of hydrogen, alkyl having from 1 to 10 carbon atoms, inclusive, and R$_5$OH where R$_5$ is alkyl having from 1 to 10 carbon atoms; said reaction being carried out at a temperature below the decomposition temperature of either the fatty acid reactant or titanium reactant and for a time sufficient to form a first reaction mixture; and reacting said first reaction mixture with at least one metal oxide compound selected from the group consisting of alkaline earth metals, Zn, Ni, Co, Mn, and Cr; said metal oxide compound being used in an amount at least about stoichiometric with respect to the amount of fatty acid used in forming said first reaction mixture.

2. The method according to claim 1 wherein R and R$_1$ are alkyl having from 1 to 18 carbon atoms per molecule, inclusive; the combination of X, Y and R$_2$ in a given Ti reactant is one of (a) when X is oxygen, Y is

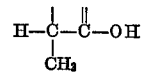

and R$_2$ is hydrogen, (b) when X is oxygen, Y is

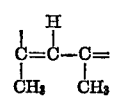

R$_2$ is C$_3$H$_7$, (c) when X is —N(CH₂—CH₂—OH)₂, Y is

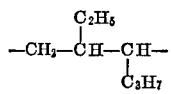

and R₂ is C₃H₇, and
(d) when X is —OH, Y is

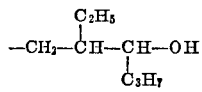

and R₂ is

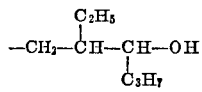

3. The method according to claim 2 wherein said fatty acid has from 12 to 22 carbon atoms per molecule, inclusive, said Ti component is used in amounts of from about 0.01 to about 15 weight percent based on the total weight of the fatty acid present, said metal oxide compounds are used in a comminuted form wherein substantially all of said metal or metal oxide compound will pass through a 100 mesh screen.

4. The method according to claim 2 wherein said first reaction mixture is prepared using a temperature of from about 75 to about 450° F. and a reaction period of at least about 0.5 minute, and the reaction of said first mixture and said metal oxide compound is carried out using a temperature of from about 100 to about 400° F. and a reaction period of at least about 0.5 minute.

5. The method according to claim 1 wherein said Ti reactant is at least one of tetraisopropyl titanate, tetrabutyl titanate, tetrakis (2-ethylhexyl) titanate, tetrastearyl titanate, polyhydroxy stearate titanate, tetraoctylene glycol titanate, triethanolamine titanate, titanium acetyl acetonate, titanium lactate, alkali metal salts of titanium lactate and ammonium salts of titanium lactate.

6. The method according to claim 1 wherein said fatty acids have from 18 to 22 carbon atoms per molecule, inclusive, the Ti reactant is tetraisopropyl titanate, said fatty acids and Ti reactant are reacted in amounts of from about 0.1 to about 10 weight percent based on the total weight of the fatty acid used and at from about 200 to about 350° F. for at least about 0.5 minute, the metal oxide compounds being comminuted to pass a 100 mesh screen and being used in amounts of from about stoichiometric up to about 15 weight percent excess based on the total weight of fatty acid used in forming said first reaction mixture, said metal oxide compounds being reacted with said first mixture at temperatures of from about 100 to about 400° F. for at least 0.5 minute.

7. The method according to claim 1 wherein said fatty acids have from 18 to 22 carbon atoms per molecule, inclusive, the Ti reactant is one of tetrabutyl titanate, tetrakis (2-ethylhexyl) titanate, tetrastearyl titanate, tetraoctylene glycol titanate, triehanolamine titanate, titanium acetyl acetonate and ammonium salts of titanium lactate, said fatty acids and Ti reactant are reacted in amounts of from about 0.1 to about 10 weight percent based on the total weight of the fatty acid used and at from about 200 to about 350° F. for at least about 0.5 minute, and the metal oxide compounds being comminuted to pass a 100 mesh screen and being used in amounts of from about stoichiometric up about 15 weight percent excess based on the total weight of fatty acid used in forming said first reaction mixture, said metal oxide compounds being reacted with said first mixture at temperatures of from about 100 to about 400° F. for at least 0.5 minute.

8. A fluid-loss reduction agent for drilling fluids consisting essentially of
(1) the reaction product of at least one fatty acid having 10 to 31 carbon atoms per molecule, inclusive, and an effective reaction accelerating amount of at least one of Ti(OR)₄ where R is alkyl having from 1 to 22 carbon atoms per molecule, inclusive,

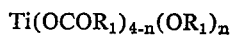

where $n$ is 0 to 3, inclusive, and R₁ is alkyl having from 1 to 22 carbon atoms per molecule, inclusive,

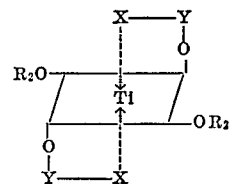

where X is one of oxygen, nitrogen; —OH, —NH, —N(R″OH)$_z$, R″ is alkyl having from 1 to 10 carbon atoms, inclusive, and $z$ is 1 or 2; Y is one of

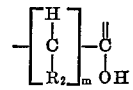

R₂ being hydrogen or alkyl having from 1 to 8 carbon atoms, inclusive, and $m$ is

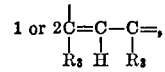

R₃ being alkyl having from 1 to 8 carbon atoms, inclusive,

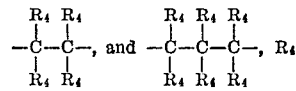

hydrogen and alkyl having from 1 to 4 carbon atoms, inclusive; and R₂ is one of hydrogen, alkyl having from 1 to 10 carbon atoms, inclusive, and R₅OH where R₅ is alkyl having from 1 to 10 carbon atoms; and (2) at least one metal oxide compound selected from the group consisting of alkaline earth metals, Ni, Co, Mn, and Cr in an amount at least about stoichiometric with respect to the fatty acid present in (1).

9. The fluid-loss reduction agent according to claim 8 wherein R and R₁ are alkyl having from 1 to 18 carbon atoms per molecule, inclusive; the combination of X, Y and R₂ in a given Ti reactant is one of (a) when X is oxygen, Y is

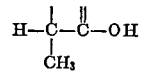

and R₂ is hydrogen,
(b) when X is oxygen, Y is

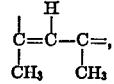

R₂ is C₃H₇,
(c) when X is —N(CH₂—CH₂—OH)₂, Y is
—CH₂—CH₂—,
and R₂ is C₃H₇, and
(d) when X is —OH, Y is

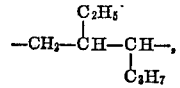

and R₂ is

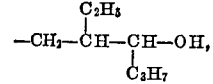

the titanium component is present in amounts of from about 0.01 to about 15 weight percent based on the total weight of the fatty acid present, and up to a 15 percent excess with respect to the fatty acid of metal oxide compound is present.

10. The fluid-loss reduction agent according to claim 8 wherein said Ti reactant is at least one of tetraisopropyl titanate, tetrabutyl titanate, tetrakis(2 - ethylhexyl) titanate, tetrastearyl titanate, polyhydroxy stearate titanate, tetraoctylene glycol titanate, triethanolamine titanate, titanium acetyl acetonate, titanium lactate, alkali metal salts of titanium lactate and ammonium salts of titanium lactate.

11. The fluid-loss reduction agent according to claim 8 wherein said fatty acids have from 18 to 22 carbon atoms per molecule, inclusive, the Ti reactant is tetraisopropyl titanate and said metal oxide in (2) is present in amounts of from about stoichiometric up to about 15 weight percent excess based on the total weight of fatty acid used in forming (1).

12. The fluid-loss reduction agent according to claim 8 wherein said fatty acids have from 18 to 22 carbon atoms per molecule, inclusive, the Ti reactant is at least one of tetrabutyl titanate, tetrakis(2-ethylhexyl) titanate, tetrastearyl titanate, tetraoctylene glycol, triethanolamine titanate, titanium acetyl acetonate and ammonium salts of titanium lactate and said metal oxide in (2) is present in amounts of from about stoichiometric up to about 15 weight percent excess based on the total weight of fatty acid using in forming (1).

References Cited

UNITED STATES PATENTS

| 3,196,166 | 7/1965 | Kronstein et al. | 260—347.8 |
| 3,409,573 | 11/1968 | Guinet et al. | 260—18 |
| 3,461,146 | 8/1969 | Turner et al. | 260—414 |

LEWIS GOTTS, Primary Examiner

E. G. LOVE, Assistant Examiner

U.S. Cl. X.R.

260—404; 175—17